United States Patent [19]
Oho

[11] Patent Number: 5,422,025
[45] Date of Patent: Jun. 6, 1995

[54] NON-AZEROTROPIC REFRIGERANT COMPOSITION

[75] Inventor: Suk J. Oho, Kwangmyeong, Rep. of Korea

[73] Assignees: Yohachi Senba; Eiichi Sato, both of Japan

[21] Appl. No.: 90,919

[22] Filed: Jul. 12, 1993

[30] Foreign Application Priority Data

Jul. 14, 1992 [KR] Rep. of Korea .............. 12491/1992

[51] Int. Cl.$^6$ ............................................. C09K 5/00
[52] U.S. Cl. ..................................... 252/67; 62/114; 252/69
[58] Field of Search .................... 252/67, 69; 62/114

[56] References Cited

U.S. PATENT DOCUMENTS

| | | | |
|---|---|---|---|
| 4,160,740 | 7/1979 | Sweet III | 252/75 |
| 4,170,564 | 10/1979 | Brendle | 252/68 |
| 4,251,382 | 2/1981 | Li | 252/69 |
| 4,455,247 | 6/1984 | Nakayama et al. | 252/67 |
| 4,559,993 | 12/1985 | Picard et al. | 165/1 |
| 4,578,205 | 3/1986 | Yeakey et al. | 252/76 |
| 4,588,513 | 5/1986 | Triebel et al. | 252/75 |
| 4,701,277 | 10/1987 | Mohr et al. | 252/75 |
| 4,728,452 | 3/1988 | Hansen | 252/75 |
| 4,759,864 | 6/1988 | Van Neste et al. | 252/75 |
| 4,843,840 | 7/1989 | Gibson | 62/375 |
| 4,858,445 | 8/1989 | Rasovich | 62/374 |
| 4,869,841 | 9/1989 | Matteodo et al. | 252/79 |
| 4,914,927 | 4/1990 | Miller et al. | 62/381 |
| 4,926,647 | 5/1990 | Dorri et al. | 62/51.1 |
| 4,950,181 | 8/1990 | Porter | 439/485 |
| 4,969,336 | 11/1990 | Knippscheer et al. | 62/266 |
| 4,989,416 | 2/1991 | Miller et al. | 62/381 |
| 5,023,007 | 6/1991 | Grava et al. | 252/67 |
| 5,038,571 | 8/1991 | Yokouchi et al. | 62/46.1 |
| 5,097,385 | 3/1992 | Chao-Fan Chu et al. | 361/382 |
| 5,250,208 | 10/1993 | Merchant et al. | 252/67 |

FOREIGN PATENT DOCUMENTS

54-58245  5/1979  Japan.
1143950  3/1985  U.S.S.R.

Primary Examiner—Christine Skane
Attorney, Agent, or Firm—James D. Hall

[57] ABSTRACT

A refrigerant composition for use in vapor compressing type freezer and the like is disclosed for substituting the refrigerant of CFC series which destroys the ozonic layer. The refrigerant composition of the present invention includes: 65 weight % of liquified nitrogen, 15–20 weight % of propylene glycol, 8 weight % of ethylene glycol, 2 weight % of an aqueous solution of sodium chloride, and 10–5 weight % of a surfactant. The refrigerant composition of the present invention gives a solution to the problem of the destruction of the ozonic layer.

4 Claims, 13 Drawing Sheets

NON-AZEROTROPIC REFRIGERANT COMPOSITION

The present invention relates to a refrigerant composition which includes liquified nitrogen, a multivalent alcohol, an aqueous solution of sodium chloride, and a surfactant, and which is for use in vapor compressing type freezers and the like.

A freezer performs mechanical works to bring down the temperature of a sealed vessel relative the ambient temperature, thus absorbing the heat from the vessel, or pumping heat from the lower temperature region to a higher temperature region to serve as a heat pump. In this freezer, a medium which carries heat from a lower temperature region to a higher temperature region is called refrigerant.

As the refrigerant for vapor compressing type freezer, there are ammonia ($NH_3$), and freon gas of fluoro-chloro hydrocarbon series (R11: $CCl_3F$, R-12: $CCl_2F_2$, R-22: $CHClF_2$, R-500: $CCl_2F_2/CH_3CHF_3$, R-502: $CHClF_2/CClF_2CF_3$, R-503: $CHF_3/CClF_3$, R-504: $CH_2F_2/CF_3CClF_2$, R-1130: $C_2H_2Cl_2$, R-160: $C_2H_5Cl$, R-40: $C_2H_4O_2$, R-764: $SO_2$). The above refrigerants are selectively used for different purposes such as the freezing capability, the type of the freezer, the field of the application and the like. However, this refrigerants produces severe stimulating odors which give a harmful effect to the human respiratory system, thereby making them unreliable in their safety. When these refrigerants are evaporated into the air, if their level is 50 ppm, their existence can be recognized by their odor, while if their level reaches 750 ppm, they give toxic effect to the eyes or respiratory system. If the refrigerant level in the air is 1%, it becomes fatal to the humans, and, after an exposure of 30 minutes under such condition, the humans will lose the consciousness.

Further, under a slight moisture, brass and bronze are corroded by them, while iron and steel are not corroded. Although the refrigerant of CFC series had been recognized as safe, professor F. S. Rowland et al reported in 1974 that, if the CFC refrigerant is released into the air, most of it reach the stratosphere without being decomposed, and there, the refrigerant is decomposed by ultraviolet rays to produce chlorine atoms which destroy the ozonic layer.

As a result, ultraviolet rays reach the ground of the earth in a greater amount to increase the dermatic cancer, and to adversely affect the ecosystem. From the report, the argument on the matter was further spread.

Many countries in the world began to regulate the use of the refrigerant of CFC series, and a protocol on the ozonic layer destroying material was adopted at the conference of 1987 in Montreal of Canada, the protocol being signed by 23 countries including the United States, Japan, Canada, and EC. The protocol regulated the use of R-11, R-12, R-114 and R-115 as aerosol, refrigerant and foaming materials, R-113 as detergent and dissolving medium, and 1211 and 1301 as halogen for gastrointestinal medicine.

However, in 1990 conference, the regulation was further strengthened, to such a degree that its production was to be completely prohibited by the year 2000. The ozionic layer can be regenerated through the natural process, but the ozonic layer which is destroyed by the chlorine atoms of the refrigerant of CFC series can scarcely be compensated by only the natural process.

The refrigerant diffused in the air cause the so called hothouse effect in which the visible light pass through the air, but the heat dissipation from the earth is blocked, thereby raising the average temperature of the earth. This in turn causes the raising of the temperature of the seas and the confusions of the weather, producing typhoons, draught and extension of rainy seasons. Further, as a result of the hothouse effect, the ice layers of the north and south poles of the earth are melted to heighten the sea level, with the result that the coastal regions are submerged, and the agricultural productions are adversely effected, thereby aggravating the environmental problem. Thus the use of the refrigerant of CFC series was regulated, and a need for a substitution of it came to be felt.

On this occasion, the present inventor came to study on the refrigerant which is to be used on freezers and air conditioners, and invented a non-azotropically mixed refrigerant. Particularly, the non-azotropically mixed refrigerant is different in its phase equilibrium temperatures relative to the ambient temperatures of the condenser and evaporator as the heat radiating source and as the heat absorbing source, thereby improving the efficiency of the freezing cycle. Further, the boiling point is properly low, the evaporating point of the refrigerant is large, and the condensating pressure is properly low. Further the specific volume of the vapor is small, the temperature of the discharge gas of the compressor is low, and the threshold temperature is sufficiently high. Further, there is no corroding effect, the safety is high, pollution and contaminations are not caused, and the price is low.

The present invention is invented based on the above background.

Therefore it is the object of the present invention to provide a refrigerant composition which substitutes the refrigerant of CFC series, and which can be used on vapor compressing type refrigerators, freezers, industrial freezers and automobile air conditioners.

The refrigerant composition of the present invention which is used on freezers and the like includes the following ingredients.

That is, it includes nitrogen gas, one or more kinds of multivalent alcohol, an aqueous solution of sodium chloride, and a surfactant.

The multivalent alcohol may desirably propylene glycol and ethylene glycol, but other alcohols may be used. Further it is desirable to use one or more multivalent alcohol, while the surfactant may be a phosphoric ester.

The refrigerant composition of the present invention is prepared in the following manner.

a. Liquified nitrogen is injected into a reaction tank.

b. One or more of multivalent alcohols are added, and the mixture is agitated, thereby forming a first composition.

c. An aqueous solution of sodium chloride and a surfactant such as a phsophoric ester is added into the first composition.

It is desirable to add: 50-70 weight % of liquified nitrogen, 15-20 weight % of a multivalent alcohol such as propylene glycol, 8 weight % of a multivalent alcohol such as ethylene glycol; 2 weight % of an aqueous solution of sodium chloride, and 10-5 weight % of a surfactant.

Thus the new refrigerant of the present invention gives solutions to the problems of the ammonia and freon gas by providing a refrigerant composition which is not harmful to the humans and to the ecosystem of the earth. In this non-azotropically mixed refrigerant composition, the phase equilibrium temperature is increased.

The present invention will now be explained in more detail by way of the following non-limiting examples, and with reference to the accompanying drawings, in which.

EXAMPLE 1

Figure 1:
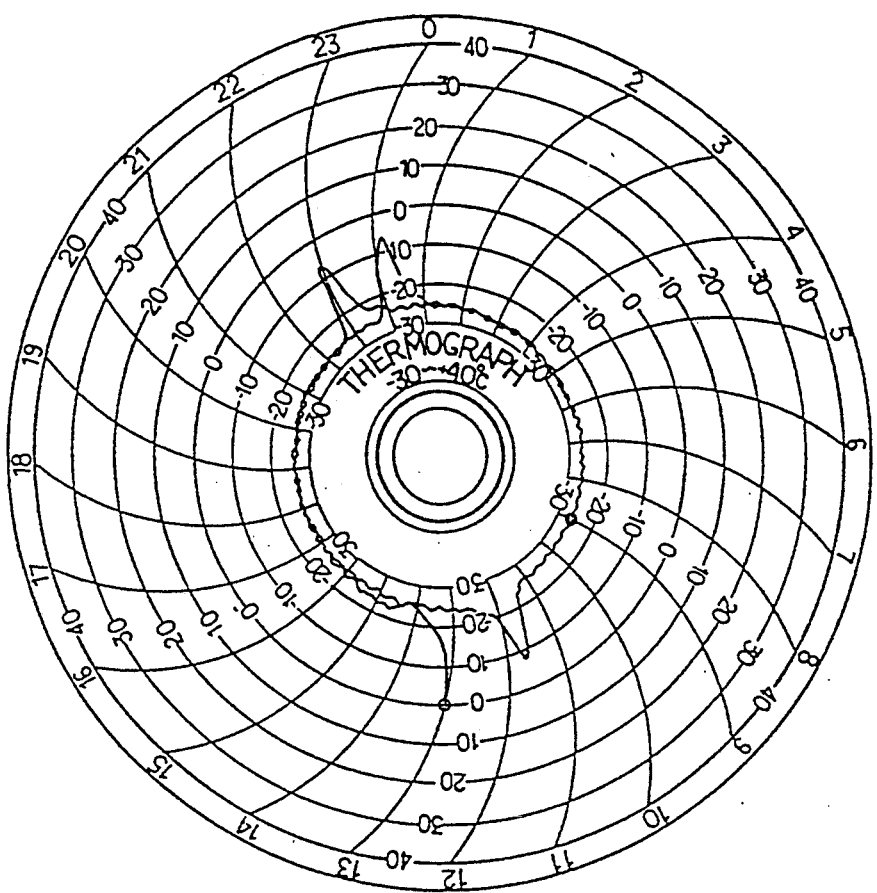
FIG. 1 is a graph showing the fluctuations of the temperature of the refrigerator from 1:00 PM of February 20 to 9:00 AM of February 22.

Liquified nitrogen: 65% (weight %)
Propylene glycol: 15-20%
Ethylene glycol: 8%
Aqueous solution of sodium chloride: 2%
Surfactant (organic): 10-5%.

EXAMPLE 2

Liquified nitrogen: 50-70% (weight %)
Propylene glycol: 15-20%
Ethylene glycol: 8%
Aqueous solution of sodium chloride: 2%
Surfactant: 5-10%
Water: 5-10%.

The preparation processes for Examples 1 and 2 of the refrigerant composition of the present invention are as follows.

That is the process includes the following 9 steps.

(1) A reaction tank is washed by using a distilled water, and then, dried.

(2) A liquified nitrogen ($LN_2$) having a temperature of $-195.8°$ C. is injected into the reaction tank at the normal temperature.

(3) Propylene glycol is put into the tank, and the two materials are mixed together for a certain period of time.

(4) After the mixing and agitating, a valve of the reaction tank is opened to discharge the reaction gas from the tank.

(5) Ethylene glycol is added into the mixture, and an agitation is carried out for a certain period of time.

(6) After teh agitation, the valve of the reaction tank is opened to discharge the reaction gas from the tank.

(7) Then an aqueous solution of sodium chloride (with a concentration of 2%) is added.

(8) Then an organic surfactant such as phosphoric ester is added, and an agitation is carried out until the foaming phenomenon is terminated.

(9) The product thus prepared is packed into sealed containers (about 3 atmosphere) in the units of 10 kg and 20 kg etc. before shipping.

The composition properties as the results of tests are shown

TABLE 1

(Ability of Refrigerant)

| | Refrigerant (Wt. %) | | |
|---|---|---|---|
| | | Refrigerant composition (100) according to the present invention | |
| Items | Freon R-12(100) | Product of example 1 | Product of example 2 |
| Pressure of high - Pressure side (Kg/$Cm^2$abs) | 17.80 | 14.05 | 14.07 |
| Pressure of low - Pressure side (Kg/$Cm^2$abs) | 1.47 | 1.23 | 1.23 |
| Compression ratio | 8.70 | 10.55 | 10.45 |
| Volumetric efficiency (%) | 53 | 53 | 53 |
| Amount of discharge($m^3$/h) | 45.57 | 45.57 | 46.05 |
| Specific volume($m^3$/Kg) | 0.060 | 0.120 | 0.130 |
| Circulating volume of refrigerant (Kg/h) | 360.46 | 180.45 | 180.45 |
| Exit enthalpy of evaporator(Kcal/Kg) | 134.13 | 128.70 | 129.05 |
| Entrance enthalply of evaporator(Kcal/Kg) | 94.61 | 108.5 | 110.5 |
| Refrigerating effect (Kcal/Kg) | 15.20 | 23.4 | 22.4 |
| Refrigerating capacity (Kcal/Kg) | 5.300 | 4.280 | 4.180 |
| Breaking index of Ozone | 1.0 | 0 | 0 |

*Note 1:
Experimental condition:
Condensing temperature: 30° C.
Evaporating temperature: $-25°$ C.
Compressor output: 7.5 KW (60 Hz)
Compressor(reciprocating) for whole close and refrigeration.
*Note 2:
The above table 1 is the actual comparative experimental table of Freon R-12 and products of examples 1 and 2 according to the present invention.

TABLE 2

| | Refrigerant (Wt. %) | | |
|---|---|---|---|
| | | Refrigerant composition (100) according to the present invention | |
| Items | Freon R-12(100) | Product of example 1 | Product of example 2 |
| Discharge pressure (Kg/$Cm^2$abs) | 10.6 | 9.55 | 9.50 |
| Suction pressure (Kg/$Cm^2$abs) | 1.23 | 1.23 | 1.23 |
| Temperature inside refrigerator (°C.) | $-27°$ C. | $-27°$ C. | $-27°$ C. |
| Room temperature (°C.) | 16° C. | 16° C. | 16° C. |

TABLE 2-continued

| | Refrigerant (Wt. %) | | |
|---|---|---|---|
| | | Refrigerant composition (100) according to the present invention | |
| Items | Freon R-12(100) | Product of example 1 | Product of example 2 |
| Condensional temperature (°C.) | 18° C. | 16.5° C. | 16° C. |
| Temperature of discharge pipe (°C.) | 34° C. | 30.5° C. | 31° C. |

Figure 2:
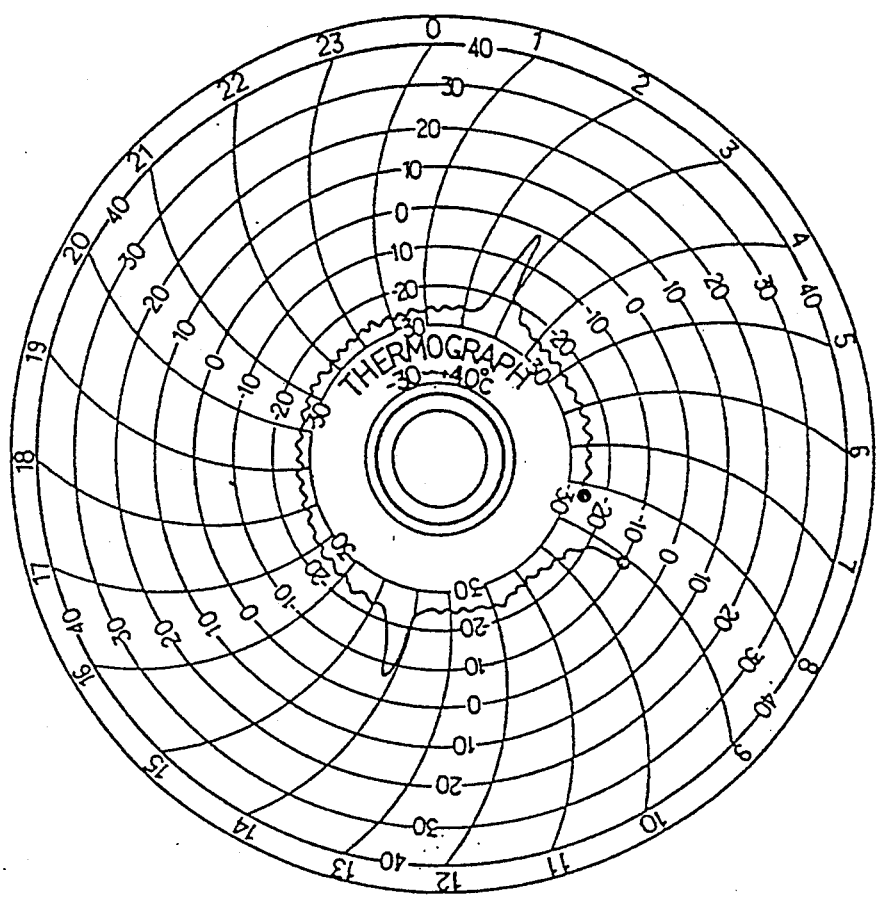
FIG. 2 is a graph showing the fluctuations of the temperature of the refrigerator from 9:00 AM of February 22 to 8:00 AM to February 23.
Figure 3:
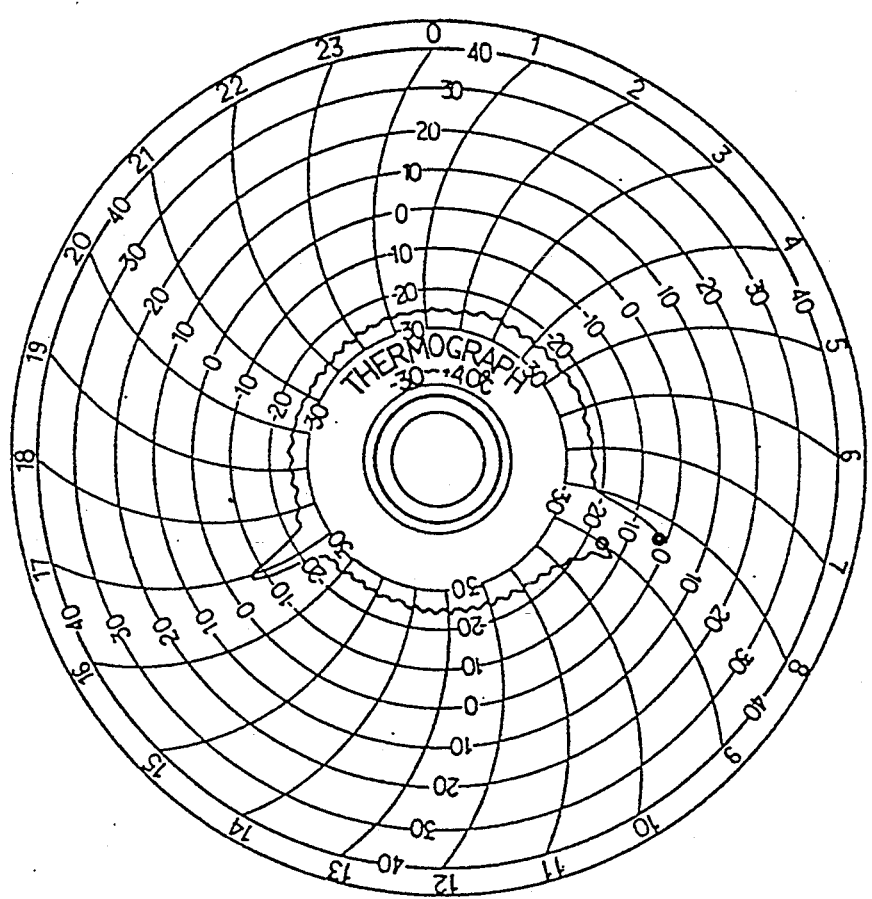
FIG. 3 is a graph showing the fluctuations of the temperature of the refrigerator from 9:00 AM of February 23 to 8:20 AM of February 24.
Figure 4:
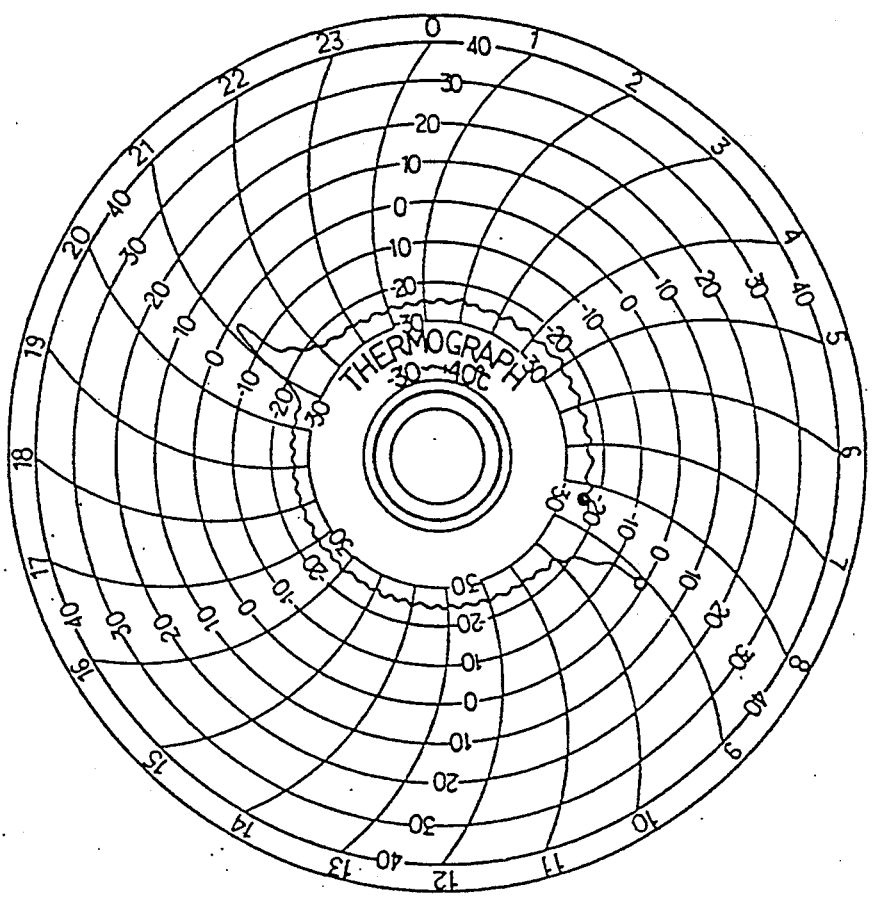
FIG. 4 is a graph showing the fluctuations of the temperature of the refrigerator from 9:10 AM of February 24 to 8:20 AM of February 25.
Figure 5:
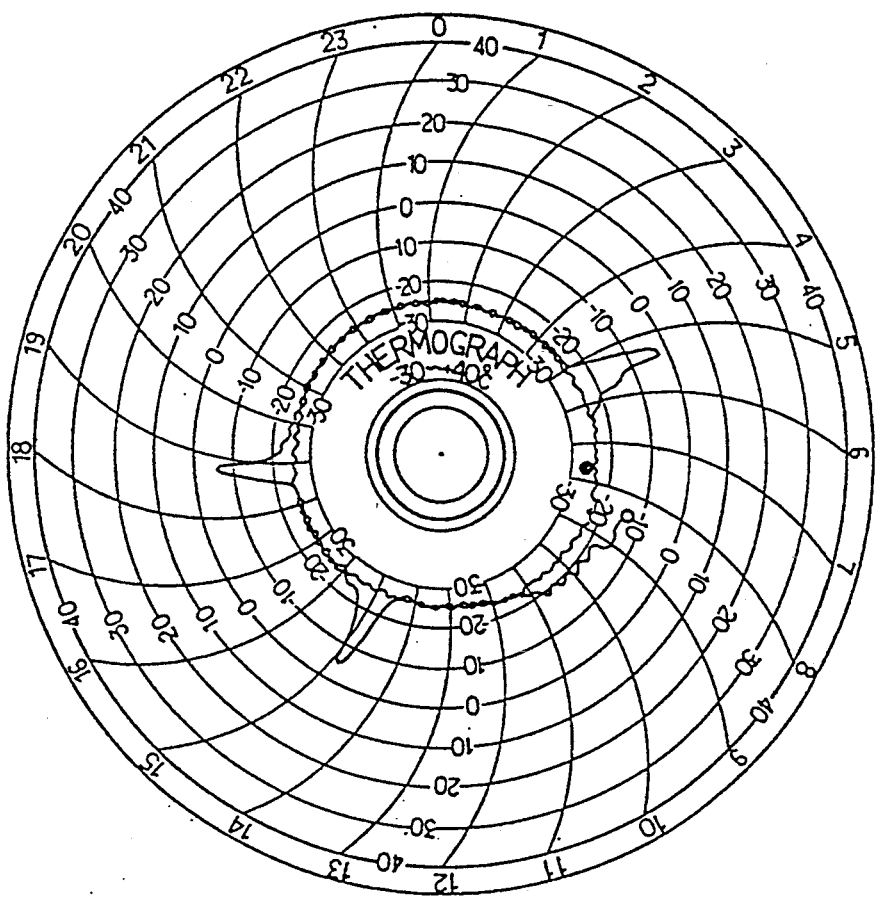
FIG. 5 is a graph showing the fluctuations of the temperature of the refrigerator from 8:20 AM of February 25 to 7:40 AM of February 26.
Figure 6:
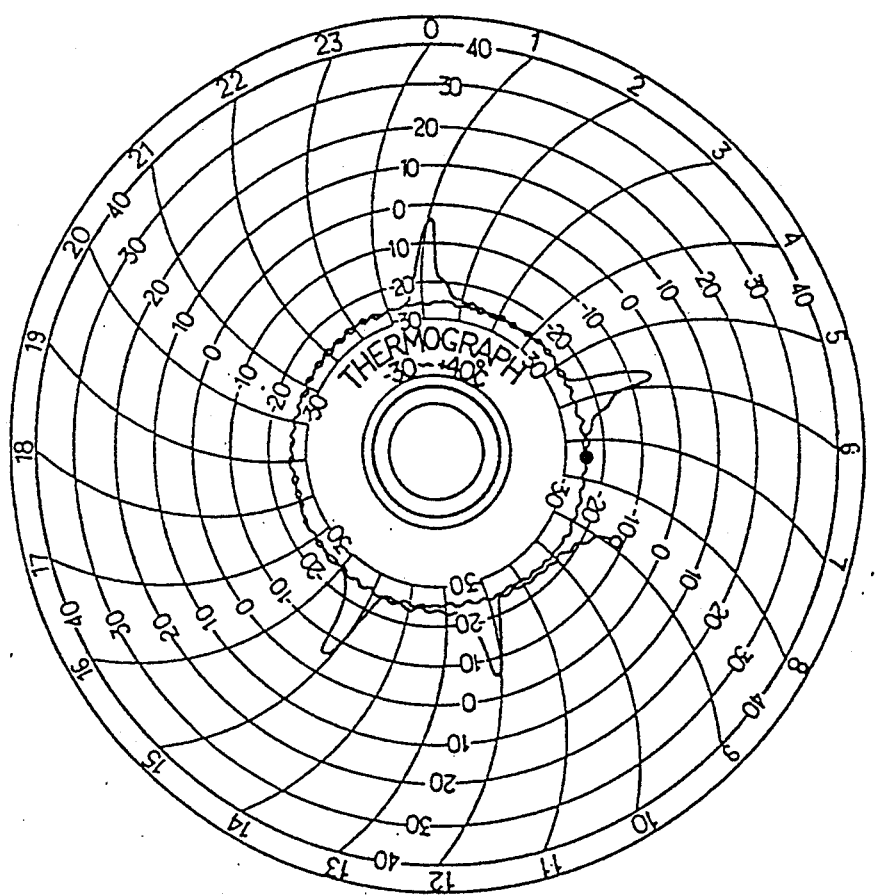
FIG. 6 is a graph showing the fluctuations of the temperature of the refrigerator from 8:50 AM of February 27 to 7:20 AM of February 28.
Figure 7:
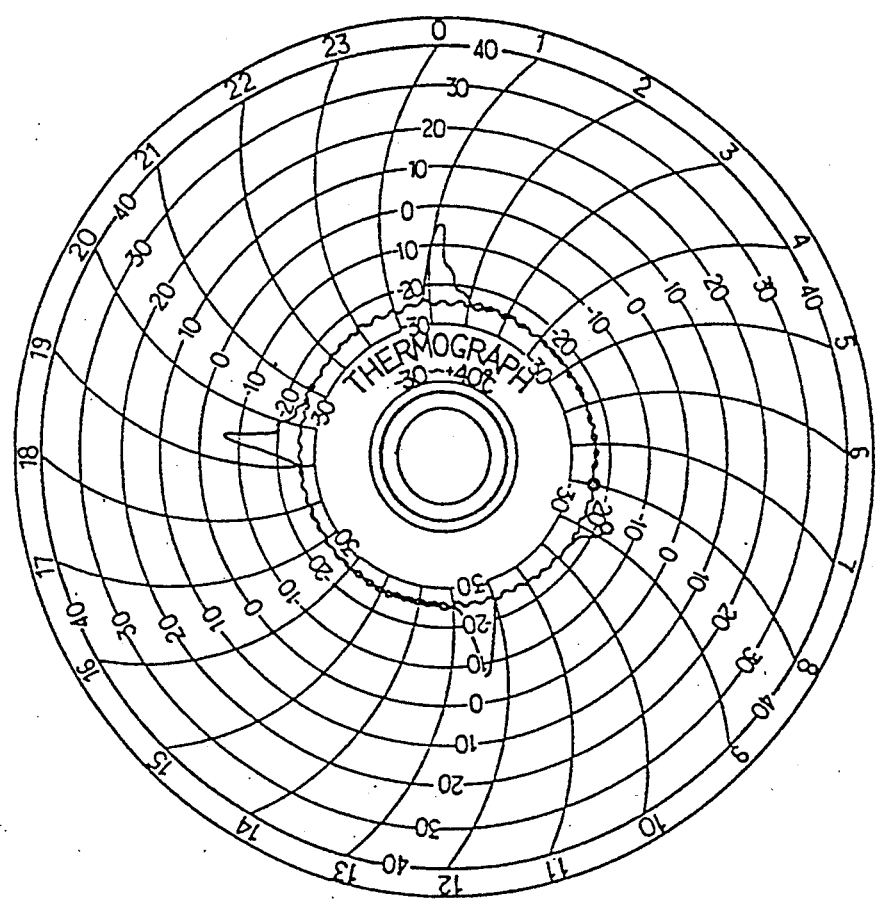
FIG. 7 is a graph showing the fluctuations of the temperature of the refrigerator from 8:50 AM of March 1 to 8:00 AM of March 2.
Figure 8:
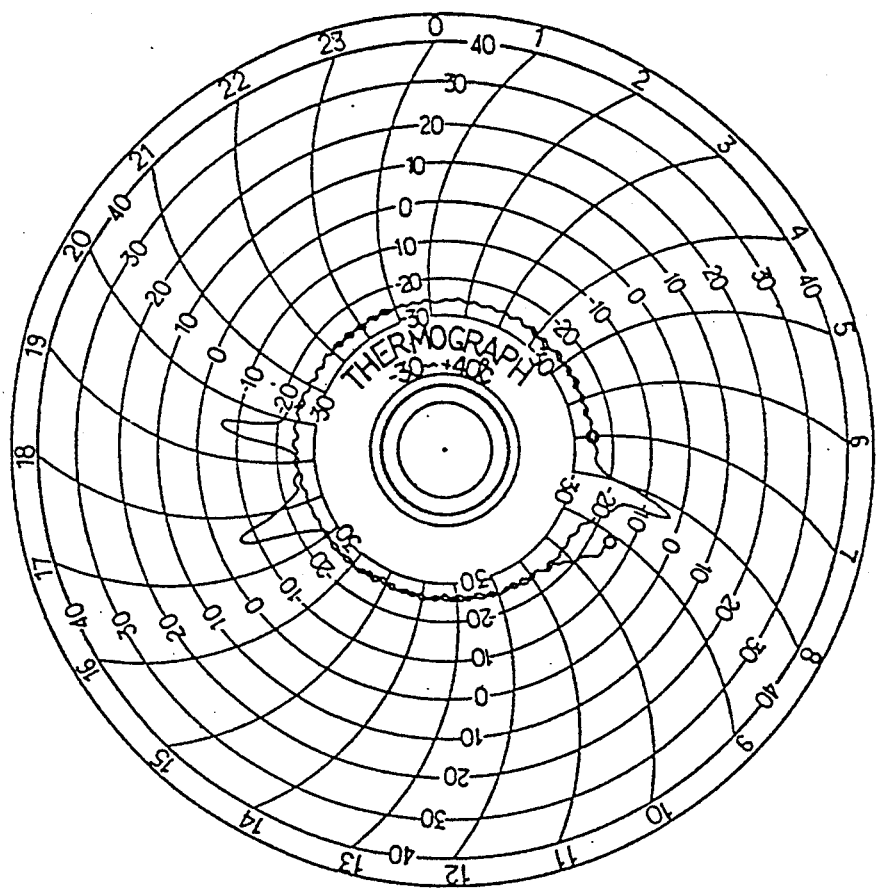
FIG. 8 is a graph showing the fluctuations of the temperature of the refrigerator from 9:00 AM of March 3 to 7:20 AM of March 4.
Figure 9:
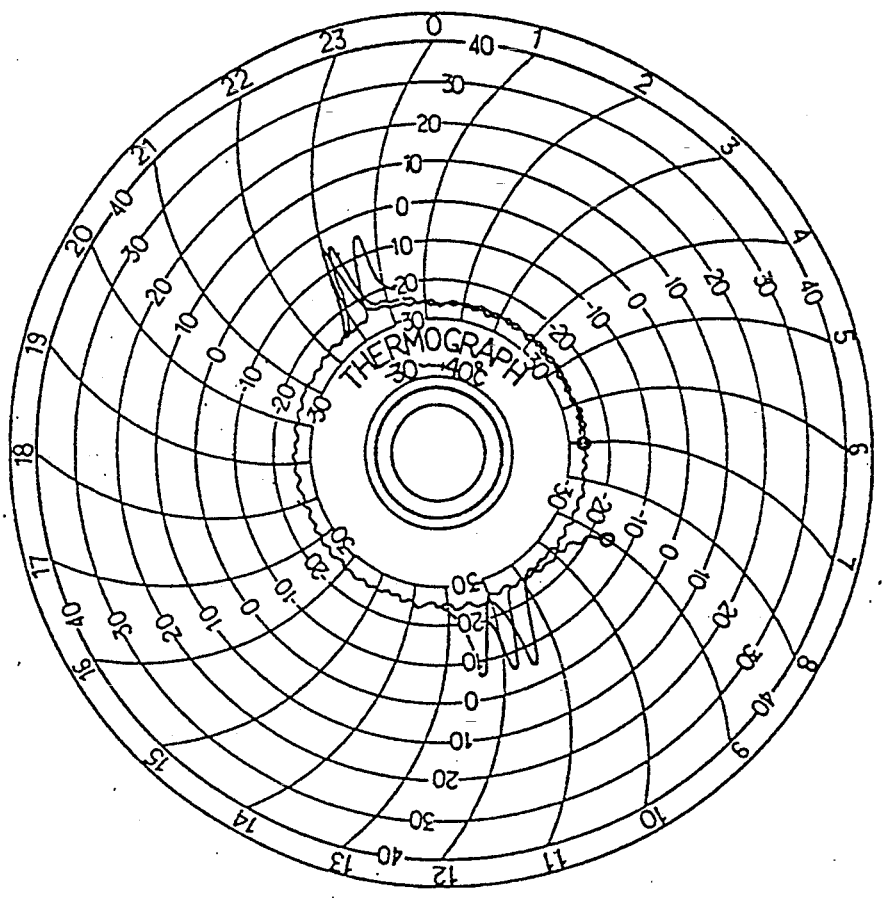
FIG. 9 is a graph showing the fluctuations of the temperature of the refrigerator from 9:00 AM of March 5 to 7:00 AM of March 7.
Figure 10:
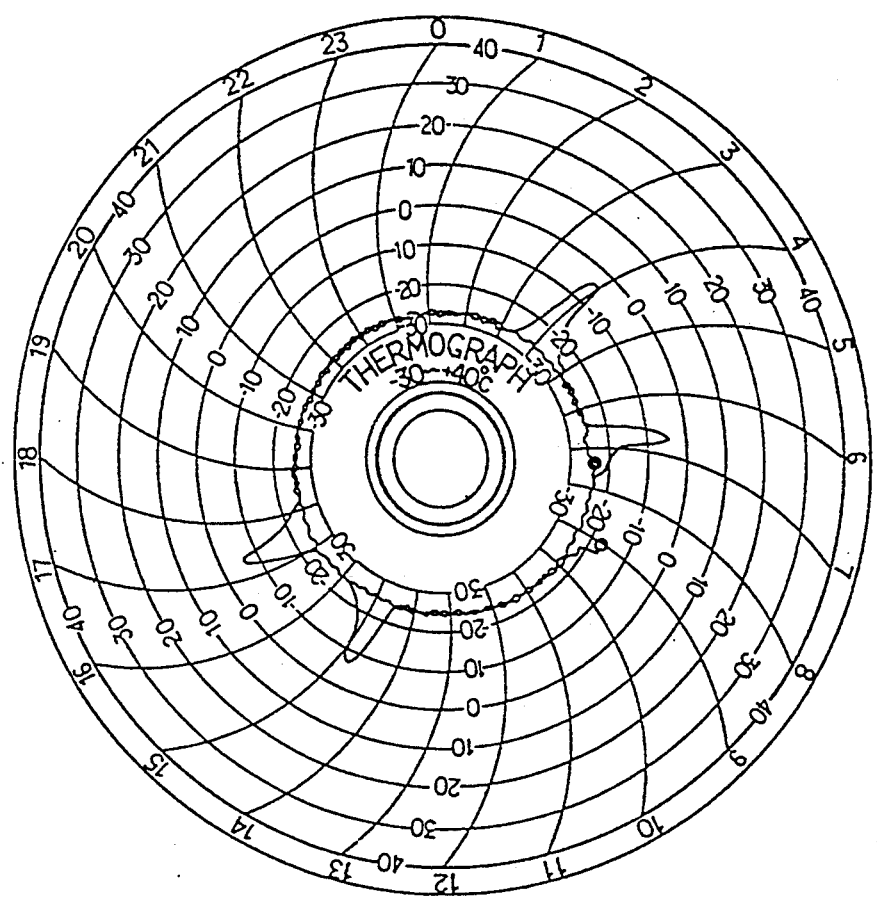
FIG. 10 is a graph showing the fluctuations of the temperature of the refrigerator from 9:00 AM of March 8 to 7:20 AM of March 9.
Figure 11:
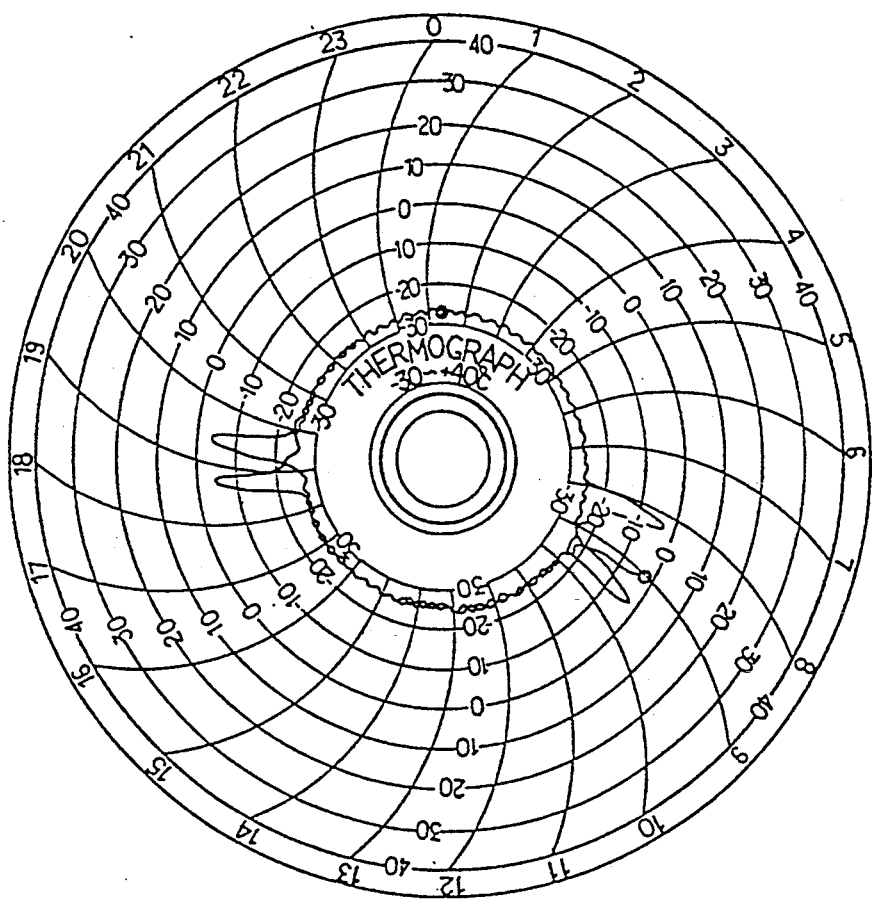
FIG. 11 is a graph showing the fluctuations of the temperature of the refrigerator from 9:00 AM of March 10 to 1:20 PM of March 12.
Figure 12:
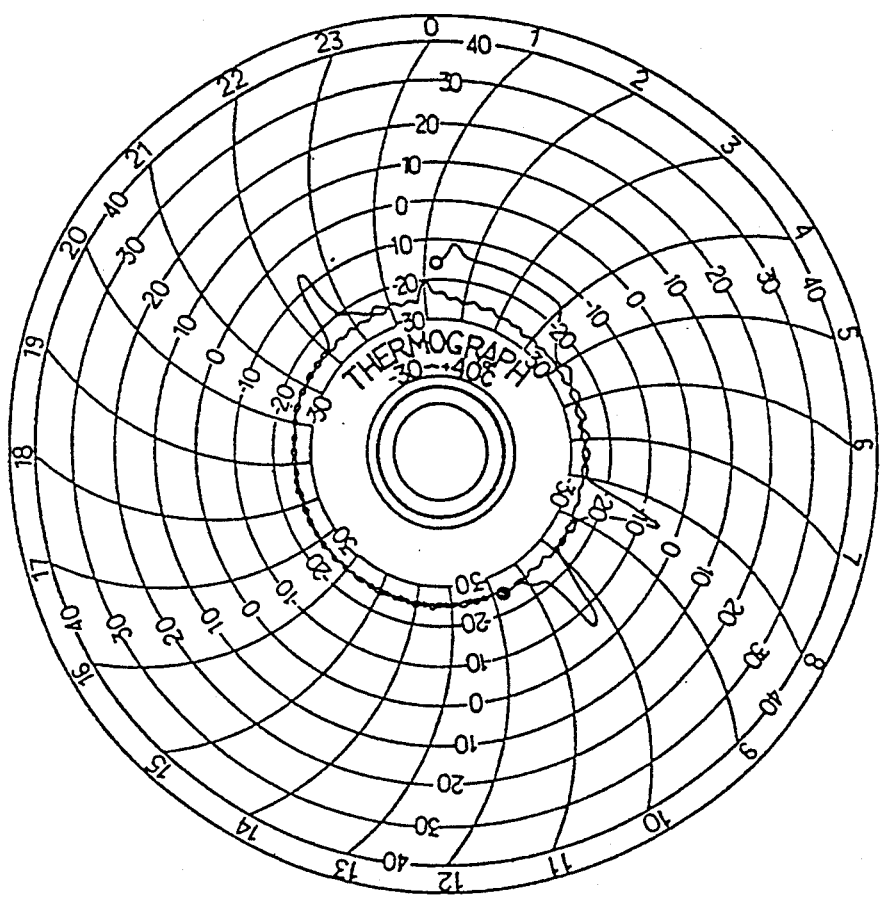
FIG. 12 is a graph showing the flucuations of the temperature of the refrigerator from 1:00 AM of March 13 to 11:40 PM of March 14.
Figure 13:
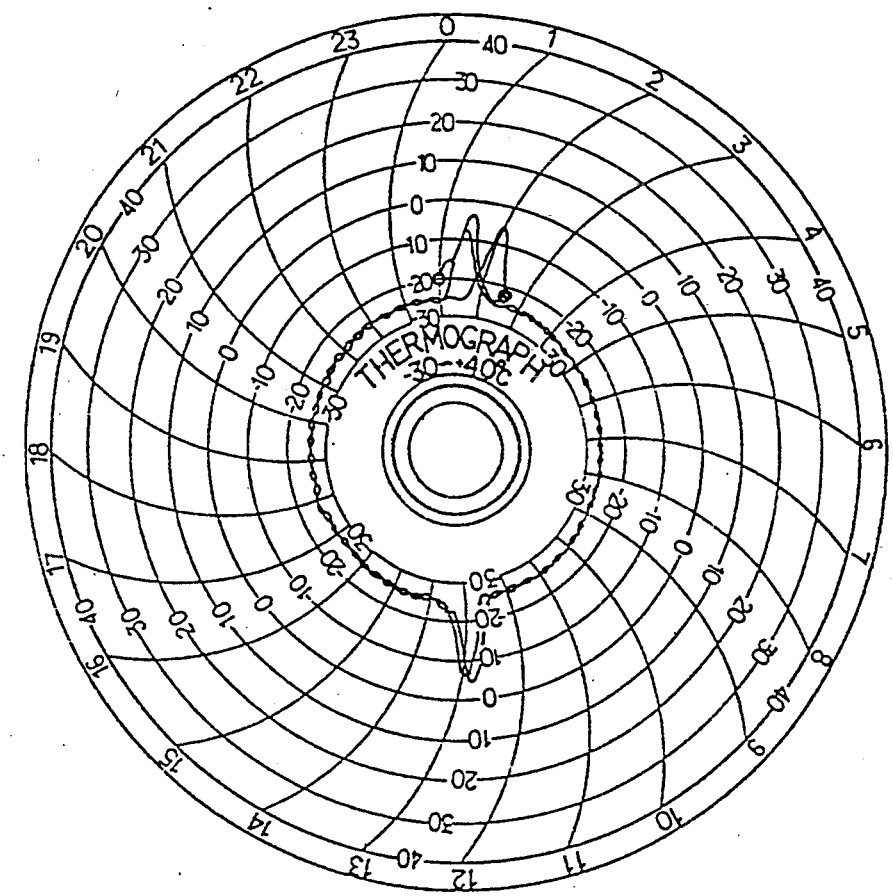
FIG. 13 is a graph showing the fluctuations of the temperature of the refrigerator from 1:00 AM of March 15 to 2:30 AM of March 16.

*Note 1:
The above table 2 is the comparative experimental table carried out with Freon R-12 and the products of examples 1 and 2 according to the present invention by using a new refrigerator MR-11K (two-door) of Mitsbishi Electric Co., Ltd.
*Note 2:
Specification of above refrigerator:
Effective inside volume: 110 l
Cooling method: cool air - forced circulation system.
Auxiliary control method: automatic.
Rated input of compressor: 89/96 W (50/60 Hz)
Model of compressor: NA33L62KA-AOMS
*Note 3:
The refrigerant composition of Example 1 as shown in Table 2 was tested after putting the refrigerant composition in the regreigerator, and the graphs shown in FIGS. 1-13 were drawn for the results of the test.
*Note 4:
The rising portion of the temperature curves indicates the temperature ($-2°$ C. $\sim -4.5°$ C.) when the refrigerator is automatically stopped, and at all the other times, the refrigerator maintains an internal temperature of $-27°$ C.
*Note 5:
"A" indicates the sample of the refrigerant composition of Example 1. In the graphs, the expressions such as 2/20, 2/21, 2/22, . . . 3/16 indicate february 20, February 21, February 22 . . . March 16, 1993.

The above experimental results show that the refrigerating capacity of the refrigerant composition according to the present invention is somewhat inferior to that of the existing Freon R-12 but the refrigerant composition according to the present invention has not any problems in using it as refrigerant.

Especially, the refrigerant composition according to the present invention satisfies the following conditions which the refrigerant should have:

(a) to have a low evaporating temperature in the atmospheric pressure.
(b) to have a low condensing pressure.
(c) to have a high evaporating latent heat.
(d) to have a low solidifying point.
(e) to have a low specific volume.
(f) to have a high critical temperature.
(g) not to react with a lubricating oil chemically.
(h) to have a low viscosity and a good electric heating action.
(i) not to be charged with electricity and also not to erode the insulating material of electricity.
(j) not to have a flashing and explosive property.

In particular, it can be said that the refrigerant composition according to the present invention is superior to HCFC-134a which is a new substitute refrigerant in that the refrigerant composition according to the present invention can use the existing compressor and other piping structure as they are.

Namely, the refrigerant composition according to the present invention has an advantage in which the composition can use the structure as it is without altering it.

According to the present invention as described above, the composition has characteristics such that the mixture of the surfactant and the aqueous solution of sodium chloride adheres on metallic or non-metallic objects to form a film on them so as to prevent the corrosion of the objects, as well as preventing the corrosion of the rubber hose used on the automobile air conditioner.

Further, the safety of the composition is very high, and other required conditions are sufficiently held by the composition.

I claim:

1. A refrigerant composition for use in refrigerating devices, comprising 50-70 weight % liquified nitrogen, 5-10 weight % surfactant, 2 weight % of an aqueous solution of sodium chloride and 8-28 weight % of one or more multivalent alcohol.

2. The refrigerant composition as claimed in claim 1, wherein said multivalent alcohol consists of propylene glycol and ethylene glycol.

3. The refrigerant composition as claimed in claim 2, wherein propylene glycol and ethylene glycol are added in the amounts of 15-20 weight % and 8 weight % respectively.

4. The refrigerant composition as claimed in claim 1, wherein said surfactant consists of a phosphoric ester.

* * * * *